G. O. TUCKER.
STRAINER FOR COFFEE POTS.
APPLICATION FILED FEB. 19, 1912.
1,048,766.
Patented Dec. 31, 1912.
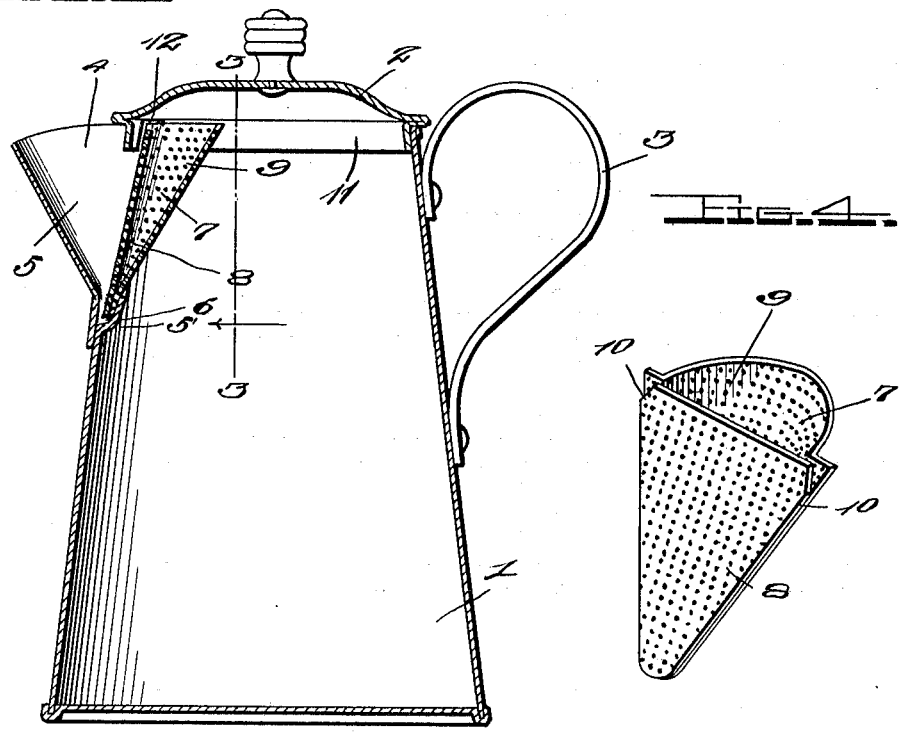
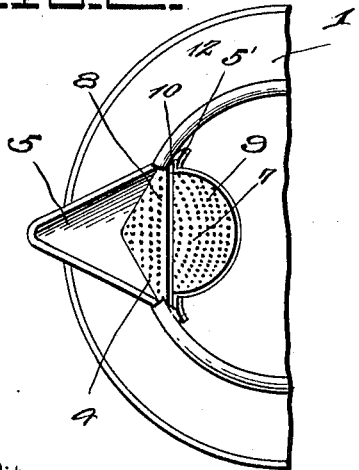
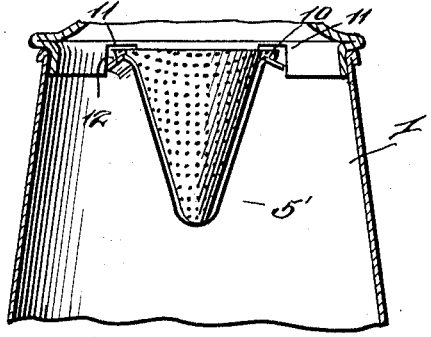
Witnesses
Chas. L. Griesbauer.
A. B. Norton.
Inventor
George O. Tucker,
By Watson E. Coleman
Attorney

UNITED STATES PATENT OFFICE.

GEORGE OTIS TUCKER, OF CHARLESTON, ILLINOIS.

STRAINER FOR COFFEE-POTS.

1,048,766.  Specification of Letters Patent.  Patented Dec. 31, 1912.

Application filed February 19, 1912. Serial No. 678,510.

*To all whom it may concern:*

Be it known that I, GEORGE OTIS TUCKER, a citizen of the United States, residing at Charleston, in the county of Coles and State of Illinois, have invented certain new and useful Improvements in Strainers for Coffee-Pots, of which the following is a specification, reference being had to the accompanying drawings.

This invention comprehends certain new and useful improvements in coffee pots and relates more particularly to that class of coffee pots having removable strainers.

The object of the invention is to provide a strainer of this nature which may be readily inserted in the receptacle and be held firmly in place over the discharge aperture while in use. And this invention also aims to generally improve this class of devices to render them more useful and commercially desirable.

With these and other objects in view, as will more fully appear as the description proceeds, the invention consists in certain constructions and arrangement of parts that I shall hereinafter more fully describe and claim.

For a full understanding of the invention reference is to be had to the following description and accompanying drawing, in which—

Figure 1 is a vertical sectional view of a coffee pot with my device applied thereto; Fig. 2 is a top view of a coffee pot with the cover open and my device in position; Fig. 3 is a vertical section on line 3—3 of Fig. 1; Fig. 4 is a perspective view of the strainer.

Corresponding and like parts are referred to in the following description and designated in the accompanying drawing by like reference characters.

Referring to the drawing by numerals, 1 designates an ordinary coffee pot having a cover 2 and a handle 3. The side of the pot opposite the handle has a V shaped discharge aperture 4 adjacent its upper edge. Secured to the outside of the pot and surrounding the opening 4 is a spout 5. The portion of the coffee pot wall adjacent the sides of the opening 4 is bent slightly inwardly forming a rib 5' and leaving a groove 6 between the inner face of the spout and the rib. This groove is adapted to receive the strainer 7. This semi-conical strainer consists of a flat, triangular, perforated wall 8 and a downwardly tapering, transversely curved perforated wall 9, joined at their side edges so as to form a flange portion 10. In order that the top of the strainer may be disposed in a horizontal plane when in use, I make the length of the curved wall, from its bottom edge to the middle of the top curved edge, somewhat greater than the corresponding distance on the flat wall. When the strainer is in use the flange 10 engages the groove 6 and the curved wall 9 projects inwardly.

To enable the cover to be closed tightly and hold the strainer firmly in position I provide the flange 11 of said cover with slots 12. The sides of these slots engage the outer face of flange 10 and the upper edge of rib 5' thus preventing any movement of the strainer.

From the foregoing description in connection with the accompanying drawing it will be seen that I have provided a simple, durable and efficient strainer which may be readily withdrawn from the coffee pot for cleaning purposes.

Having thus described my invention, I claim:

The combination with a coffee pot provided in one side thereof with a V-shaped opening, a spout secured to the coffee pot surrounding the opening, the marginal edges of said opening being bent inwardly and adapted to coöperate with the spout to form a groove, a strainer comprising a perforated plate and a transversely curved perforated plate connected together and formed with side flanges adapted to seat within the said groove of the coffee pot, a cover provided in its flange with slots adapted to straddle the marginal edges of the V-shaped opening and the strainer disposed therein to hold the latter against displacement.

In testimony whereof I hereunto affix my signature in the presence of two witnesses.

GEORGE OTIS TUCKER.

Witnesses:
T. L. GALBREATH,
S. H. WILKINS.